Feb. 5, 1929.                                                1,701,366
H. T. HERR ET AL
INTERNAL COMBUSTION ENGINE
Filed March 31, 1927          7 Sheets-Sheet 2

WITNESSES:
E. Lutz

INVENTORS
H.T.Herr, &
A.T.Kasley
BY a.B.Reavis
ATTORNEY

Patented Feb. 5, 1929.

1,701,366

UNITED STATES PATENT OFFICE.

HERBERT T. HERR, OF MERION, AND ALEXANDER T. KASLEY, OF MOORE, PENNSYLVANIA, ASSIGNORS TO WESTINGHOUSE ELECTRIC & MANUFACTURING COMPANY, A CORPORATION OF PENNSYLVANIA.

INTERNAL-COMBUSTION ENGINE.

Application filed March 31, 1927. Serial No. 179,814.

Our invention relates to multiple cylinder engines wherein the cylinders are arranged in polygonal formation with crank shafts disposed at the vertices of the polygon and power transmission means is arranged to connect the crank shafts for operation in unison, and it has for an object to provide apparatus which shall be simple in design, strong, and of compact form.

More particularly our invention has for an object to provide a built-up engine frame which shall be strong and light, and capable of being readily manufactured and easily assembled.

A further object of our invention is to provide an engine frame for supporting a polyhedral engine disposed thereabout as well as a generator disposed at least in part in the frame and connected to the engine.

A further object of our invention is to provide an engine supporting frame consisting of vertically disposed cylinder supporting plates connected by side plates, horizontal cylinders being supported by the supporting plates and the sets of cylinder supporting plates and side plates forming built-up channel constructions for supporting the generator.

A further object of our invention is to provide improved scavenging apparatus for a two-cycle internal combustion engine.

The present invention constitutes an improvement upon the construction disclosed and claimed in the application of Henry F. Schmidt, Serial No. 118,257, filed June 24, 1926, and assigned to the Westinghouse Electric & Manufacturing Company, in which there is disclosed a polyhedral form of opposed-piston, two-cycle type of Diesel engine, a prismatic box structure defining the body of the polyhedron and constituting the supporting means for the cylinders. In this application, a generator is shown extending throughout the box structure, scavenging air being supplied to the space between the exterior of the generator and the interior of the box and passing from such space to the cylinders to scavenge the latter. Gearing is shown at the bottom for connecting the corner crank shafts of the arrangement with the rotor of a vertically disposed generator.

In accordance with the present invention, the polygon arrangement of horizontally disposed cylinders as well as corner crank shafts is preserved; however, the frame construction for supporting the various parts has been changed. In general, in accordance with our present invention, the horizontally disposed cylinders have their terminal portions carried by vertically disposed cylinder supporting corner plates, the latter plates being arranged in pairs and each pair being connected to a side plate, thereby providing built-up channel elements. These channel elements are connected in polygonal formation, and they support, not only the engine means, but also the generator.

Owing to the fact that the frame is made mainly of metallic plate material, material having dependable and excellent physical properties may be employed, thereby making it possible to reduce the weight of the engine. Also the plates may be so formed that material may be disposed to the best advantage and assembled expeditiously. Owing to the fact that the crank shaft bearings are connected by tension plates and are also connected to the side plates, a structure is provided which is resistive to engine working forces, thereby relieving the cylinders of such forces.

The foregoing, as well as other objects, are accomplished by our invention as will be apparent from the following description taken in connection with the accompanying drawing, forming a part of this application, in which.

Figure 16:
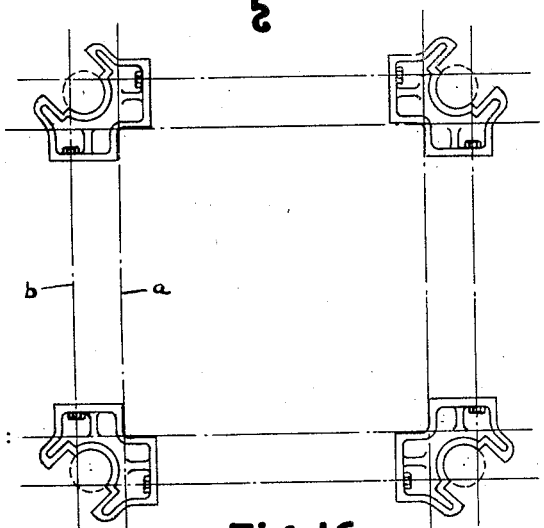

Figs. 6 to 15, inclusive, are detail views of the frame construction and parts thereof;

Fig. 16 is a diagrammatic view showing a principle of the design.

Referring now to the drawings more in detail for a better understanding of our invention, we show engine means, at 10, which is disposed about and which is carried by a supporting frame 11, the frame 11 also supporting the generator 12 provided with a rotor shaft 13. Scavenging blower apparatus, at 14, supplies the engine with scavenging air, as will more clearly hereinafter appear. The scavenging blower apparatus is disclosed and claimed in our application Serial No. 271,302, filed April 19, 1928, and assigned to the Westinghouse Electric & Manufacturing Company. The generator is supplied with cooling air by blower apparatus, at 15, this being disclosed and claimed in our application Serial No. 179,813, filed March 31, 1927. Air starting and fuel distributing apparatus are shown generally, at 16. An exciter at 17, is disposed above the frame and it is carried by the generator.

Referring first to the supporting frame 11 for the engine means, at 10, the frame includes vertically disposed cylinder supporting or corner plates 18 and 18ª, shown in detail in Figs. 6, 7, 14 and 15, arranged as parallel pairs or sets connected adjacent to margins of vertically extending side plates 19 and 19ª, shown in detail in Figs. 8, 9, 14 and 15. Horizontal plates 21, 22 and 23, (Figs. 11, 12, 13 and 14) are connected to the cylinder supporting plates, these horizontal plates having approximately triangular portions 21', 22' and 23', respectively, which fit the angular spaces between adjoining cylinder supporting plates 18 or 18ª of the sets. The upper plate 21 preferably overlaps the upper edges of the side plates 19 and 19ª as well as the upper edges of the corner plates 18. The plates 22 and 23 are preferably arranged so that the triangular portions 22' and 23' thereof fit opposed faces of the corner supporting plates or members 18 and 18ª as just described.

The side plates 19 and 19ª, between the horizontal plates 21 and 22, are connected by gusset plates 24 so as to provide a scavenge air supply chamber as hereinafter referred to.

Figure 4:
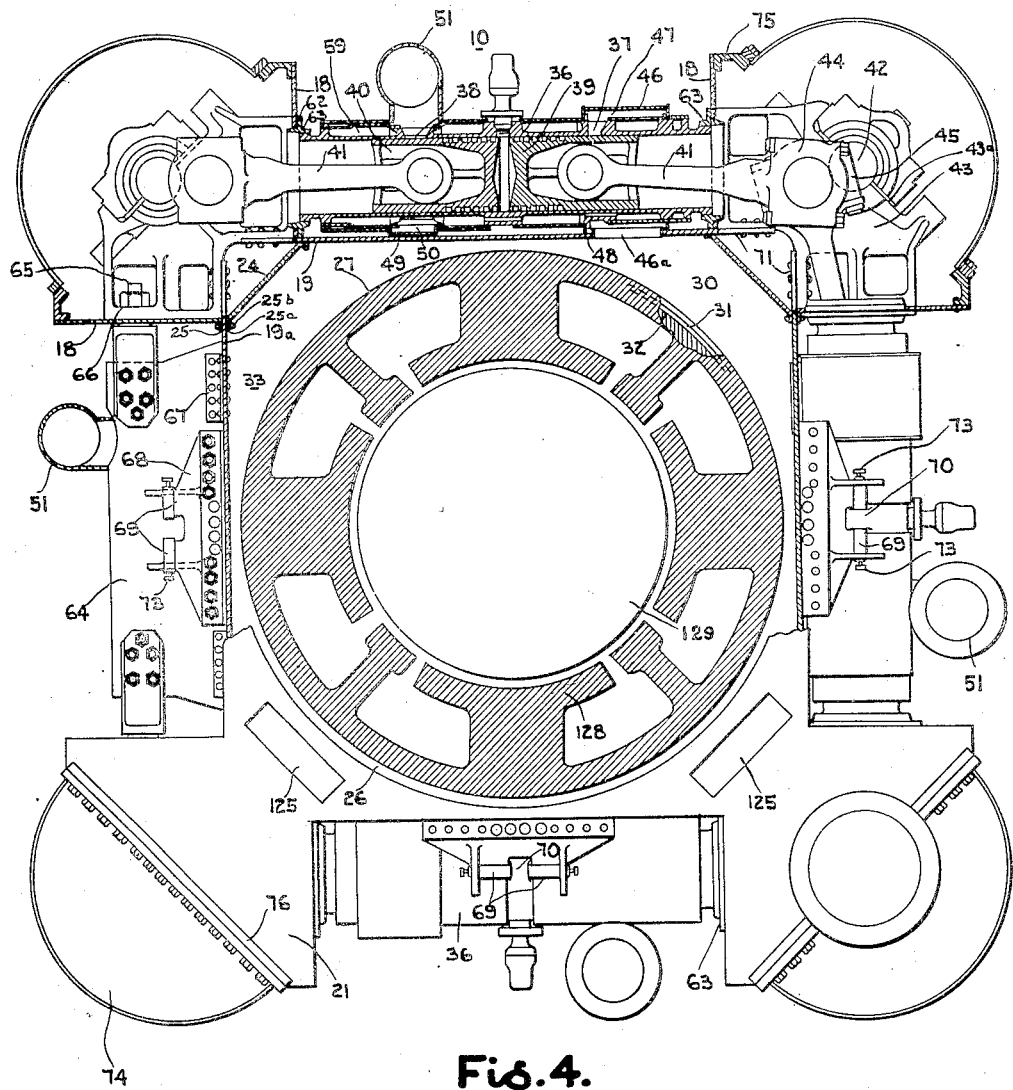
Fig. 4 is a horizontal view partly in section and partly in elevation.
Figure 11:
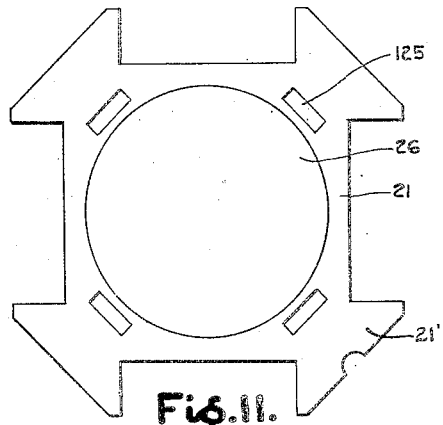
Figure 10:
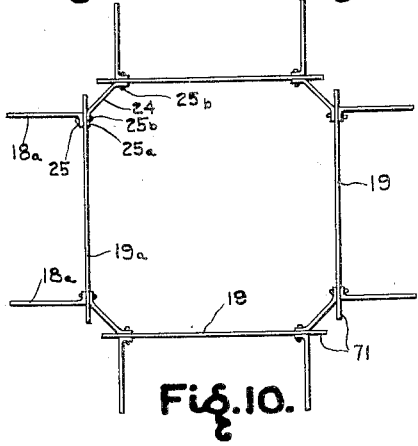
Figure 14:
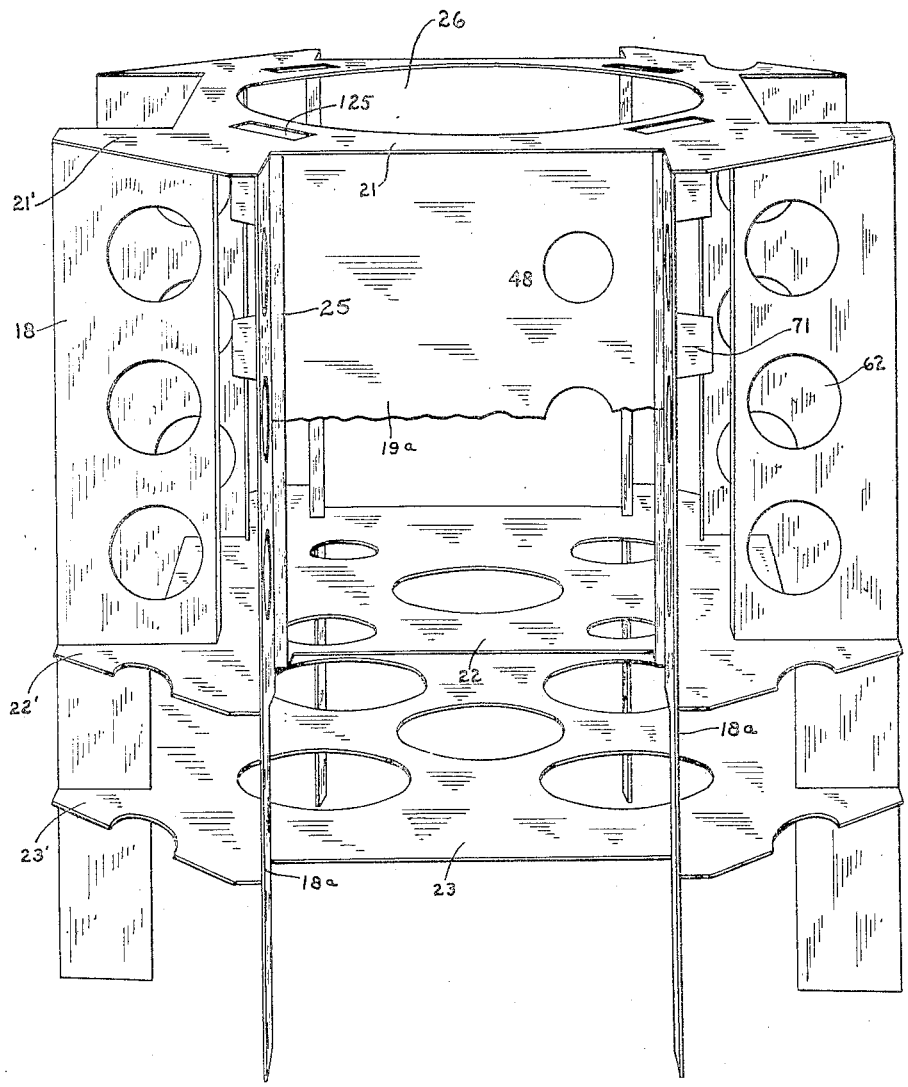

Referring to Figs. 4 and 10, the corner plates or members 18 and 18ª and the gusset members 24 are preferably provided with flanges 25 and 25ª disposed in registering relation on opposite sides and adjacent to the vertical margins of the side plates 19 and 19ª, rivets or bolts 25ᵇ passing through these parts to hold them together.

The top plate 21 is provided with an opening 26 to receive the portion 27 of the generator 12, the generator 12 being provided with feet 28, which rest on the top plate 21 and extend outwardly over the upper edges of the vertical plates 19 and 19ª.

Between the upper plate 21 and the intermediate plate 22 (Figs. 3 and 4), there is a separating wall 30 connected interiorly of the walls of the box construction and having an upstanding circular flange 31 which cooperates with a suitable joint portion 32 provided on the generator. In this way, the interior space of the box construction is divided into two chambers, one, a chamber, at 33, supplied with scavenging air from the blower at 14, and the other, a chamber, at 34, supplied with generating cooling air from the blower at 15.

It will, therefore, be apparent that the frame construction 11 is built up of plate members. The side plates, 19 and 19ª, cooperate with corner plates, 18 or 18ª, to provide, in effect, channel-like supporting constructions or elements, the vertical corner plates, 18 or 18ª serving as flanges and the side plates, 19 or 19ª serving as webs of such channel-like elements. The channel-like elements cooperate directly to support the generator 12 and they are connected together and serve the further purpose of supporting the engine means as hereinafter pointed out.

The engine means, at 10, surrounds the frame structure 11 and it includes engine cylinders 36 having scavenging air inlet openings 37 and exhaust openings 38 (Fig. 4). Opposed pistons 39 and 40 are arranged in each cylinder 36 and they cover and uncover the openings 37 and 38, respectively. The exhaust piston 40 leads the piston 39 in order to secure opening of the exhaust openings first. The pistons are connected by rods 41 to the vertical crank shafts 42 carried by corner bearings 43ª on the corner brackets or supports 43.

Figure 1:
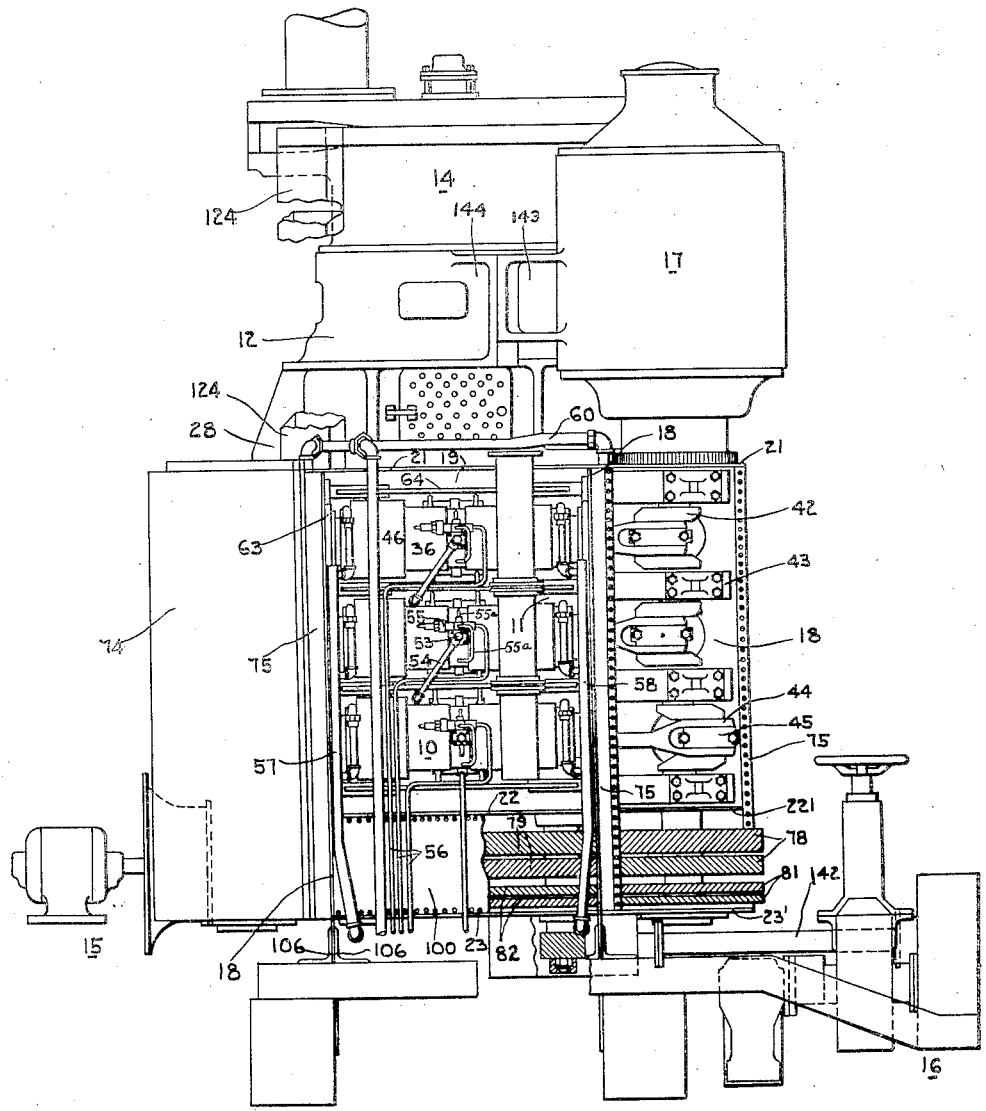
Fig. 1 is a front elevation of our improved engine showing the right side crank case removed.

As the cylinders 36 are arranged in superposed polygonal groups with the cylinders of each group co-planar, it is necessary to provide interfitting rod bearing portions for the crank portions of the crank shafts. To this end, as shown in Figs. 1 and 4, one rod of a bearing has a bifurcated bearing portion 44, which receives the bearing portion 45 of the associated rod.

The scavenging air inlet openings 37 of the cylinders are surrounded by hood or housing members 46 providing peripheral passages 47, which communicate, by way of rings or sleeves 46ª disposed in the openings 48 in the vertical plates 19 and 19ª, with the scavenge air space 33. Exhaust hoods 49 surround the exhaust openings 38 and provide peripheral passages 50 communicating with the exhaust manifolds 51.

The inlet hoods or housings 46 serve the purposes of securing peripheral admission of scavenging air and of localizing contamination of such air. When the scavenge air inlet openings are first opened, the interior pressure in a cylinder is above the scavenge air pressure at heavy loads, with the result that there is a back flow of products of combustion for a very short period of time, that is, until a sufficient amount of products of combustion is exhausted to reduce the cylinder pressure to a point below the scavenge air pressure. Any contamination of scavenging air is, therefore, localized within the scavenge air inlet hoods or housings 46 and the air in the main scavenge air supply chamber 33 remains relatively pure.

Upon reference to Fig. 4, it will be seen that, with four cylinders arranged in square formation, the exhaust openings 38 are all arranged at diagonally opposed corners and the inlet openings 37 are arranged at the remaining two diagonally opposed corners. This is necessary on account of the lead given to the exhaust pistons by their crank shafts.

The cylinders 36 are provided with air starting inlets 53, (Fig. 1), supplied by conduits 54, and with fuel injection inlet devices 55, supplied by conduits 56, the conduits 54 and 56 being supplied from any suitable air starting and fuel distributing apparatus indicated generally, at 16. Each of the fuel inlet devices 55 preferably supplies fuel to two branches 55$^a$, thereby securing better distribution of fuel.

The cylinders 36 are water cooled, inlet and outlet conduits 57 and 58 (Fig. 1) being provided for the circulation of cooling medium through the jacket spaces 59 (Fig. 4) of the cylinders. The pistons 39 and 40 are preferably made of a material having a high conductivity of heat, for example, copper, pistons of this character being disclosed and claimed in the application of Alexander T. Kasley, Serial No. 162,796, filed January 22, 1927, and assigned to the Westinghouse Electric & Manufacturing Company.

Figure 2:
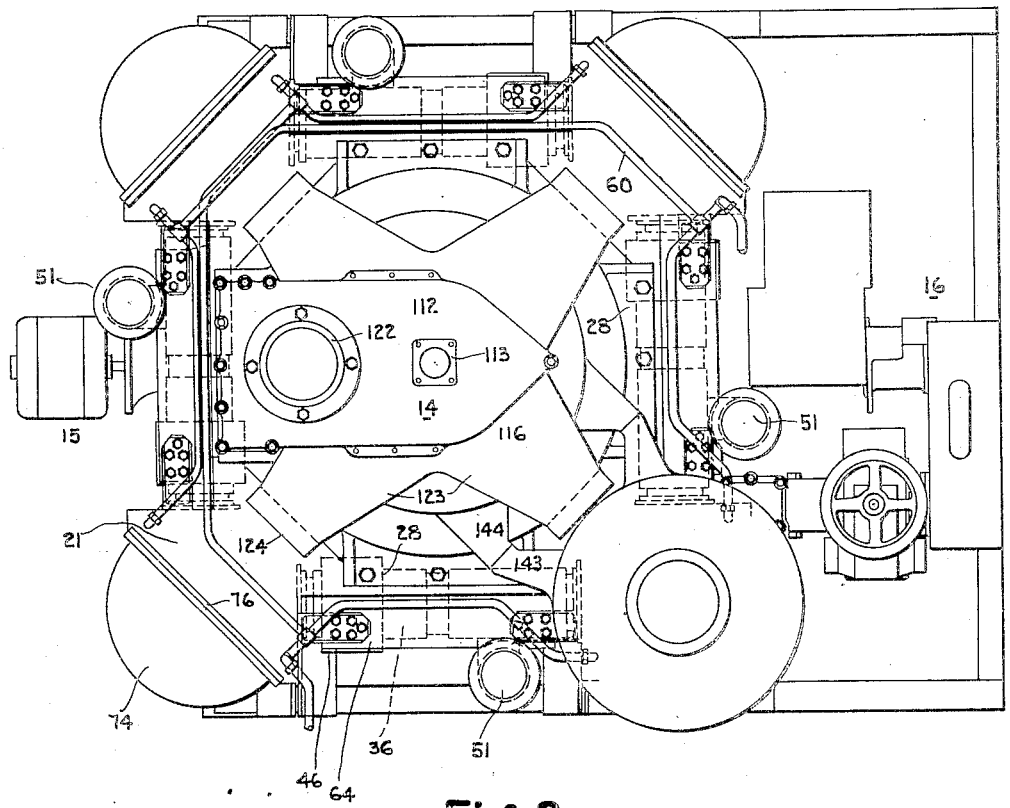
Fig. 2 is a top plan view of the apparatus shown in Fig. 1.
Figure 5:
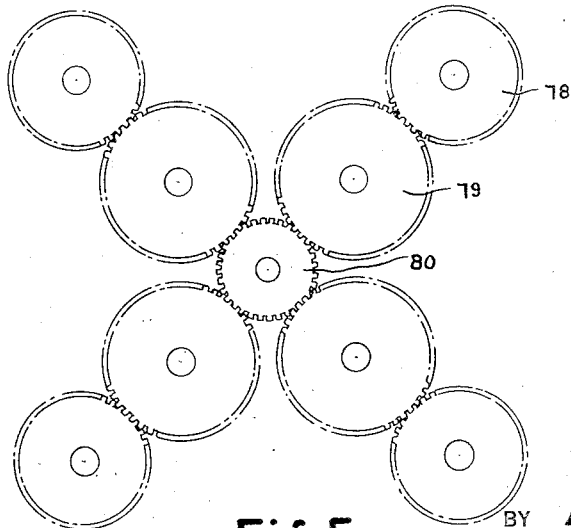
Fig. 5 is a diagrammatic view of the gearing for connecting the crank shafts with the generator.

Lubricant conduits 60 (Figs. 1 and 2) supply lubricant to the crank shaft bearings.

Referring now to the connections whereby the engine means, at 10, is supported by the frame 11, from Fig. 4, it will be seen that the corner plates or members 18 and 18$^a$ are provided with openings 62 adapted to receive flanged ring members 63, the latter fitting about opposite ends of each cylinder. Therefore, the terminal portions of each cylinder are carried or supported by the corner member or plates 18 and 18$^a$ and it is possible to readily remove a cylinder merely by detaching one or both of the ring members 63, slipping the detached ring member or members along the cylinder and removing the cylinder.

Horizontal tension plates 64 are arranged above and below and alternately with respect to the cylinders 36 and they are provided with threaded stems 65 passing through the corner plates 18 and 18$^a$ and through the adjacent portions 66 of the bearing brackets or supports 43 (Fig. 4). The tension plates are connected to the side plates 19 and 19$^a$ by angles 67 and by anchor members 68, the latter being provided with bifurcated portions 69 which receive lateral projections 70 on the cylinders 36.

It will, therefore, be apparent that the tension members or plates 64 not only strengthen the frame construction 11, but they serve to resist engine working forces. In this connection, it will be seen, upon reference to Figs. 4 and 16, that intersecting planes, including the threaded stem 65 define a polyhedron disposed outwardly of the axes of the crank shafts 42.

The crank shaft bearing supports or brackets 43 are connected to tongues 71 on the side plates 19 and 19$^a$. Forces applied to and tending to spread apart the bearings 43$^a$ associated with opposite ends of a cylinder, are, therefore, resisted by the tension members as well as by side plates 19 or 19$^a$. In other words, a bearing support may be regarded as a beam element having portions thereof connected to the tension members as well as to the side plates of the frame construction, the axis of the crank shafts being located between the polyhedra defined by intersecting planes $a$ and $b$ (Fig. 16) passing, respectively, through the connections of the bearing supports or brackets 43 with the side plates 19 or 19$^a$ and through the stems connecting tension plates with the crank shaft bearing supports. Due to this arrangement for resisting engine working forces, the engine cylinders are relieved of all forces except those due to pressure of the working fluid. Since forces tending to move a cylinder longitudinally are small, the anchoring elements 68, in operation, are not subjected to substantial stresses. Also, this type of construction permits of a very simple mounting for a cylinder and one which permits of the cylinder expanding and contracting axially without in any way being opposed by or tending to disturb associated parts.

Crank cases 74 (Figs. 1, 2, and 4) are arranged at the vertical corners of the structure and they are attached to flange portions 75 on the corner parts 18 and 18$^a$ and flange portions 76 on the triangular parts 21'.

Referring now to the means for transmitting power from the crank shafts 42 to the rotor of the generator, each crank shaft is provided with a gear 78, the gears 78 meshing with idlers 79 and the latter, in turn, meshing with a gear 80 on the rotor shaft 13. Adjacent to the gears 78, 79 and 80, there are gears 81, 82 and 83 constituting an anti-back lash and torsional vibration absorption train, as disclosed in application Serial No. 179,765, filed March 31, 1927.

Figure 6:
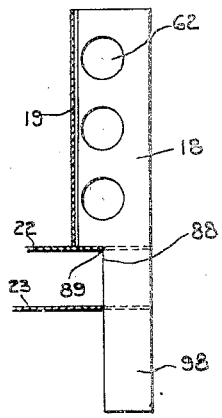
Figure 7:
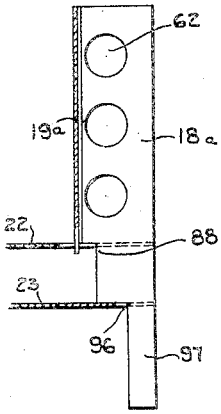
Figure 15:
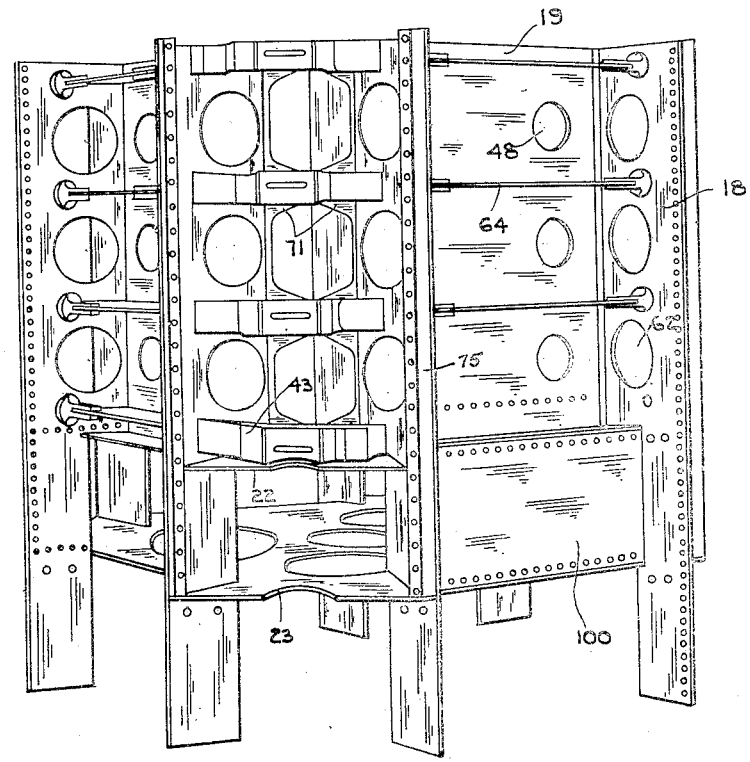

The gearing is disposed in the space between the horizontal plates 22 and 23 and it is enclosed by these members and the structure now to be described. The corner plates 18 and 18$^a$ are cut away at the inner sides, as indicated at 88 in Figs. 6 and 7, to overlap the intermediate plate 22 and to fit against lateral edges 89 and 90 of the cut out spaces 89$^a$ and 90$^a$. Three of the side plates 19 are disposed adjacent to the upper surface of the plate 22, as shown in Figs. 3, 6 and 15, while the third plate 19$^a$ has a cut out portion 91

(Fig. 9) and tongues 91ª, which fit within lateral edges 90ᵇ of the cut out portion 90ª of the plate 22 for a purpose to be described. The bottom plate 23 is provided with three cut out spaces 93 with lateral edges 93ª aligned with lateral edges 89 of the cut out spaces 89ª of the plate 22 and with a cut out space 94 of less depth having lateral edges 94ª aligned with the lateral edges 90. The pair of vertical corner plates 18 and 18ª are cut away, as indicated at 88, for the depth of the edges 89, 90 and 93ª and the plates 18ª are further cut away as indicated at 96, for the edges 94ª, whereby the plates 18 and 18ª may fit such lateral edges and provide one pair of foot portions 97, (Fig. 7), narrower than the pairs of foot portions 98, (Fig. 6). Plates 100 (Figs. 1 and 15), secured to the plates 22, 23, and 18 constitute lateral walls for the gear space at three sides, the fourth side being closed by an angular plate member 101 (Fig. 3). The plates 22 and 23, constitute upper and lower walls of the gear chamber, and are provided with opposed openings 102 and 102ª for idler gear spindles, 103 and 103ª for the rotor shaft 13, and with arcuate spaces 104 and 104ª for the crank shafts (see Figs. 12 and 13).

Below the bottom plate 23, the legs 97 and 98 provided by the corner plates 18 and 18ª are arranged to constitute supports for the engine, angles 106 being connected thereto, as may be seen from Figs. 1 and 3.

Figure 3:
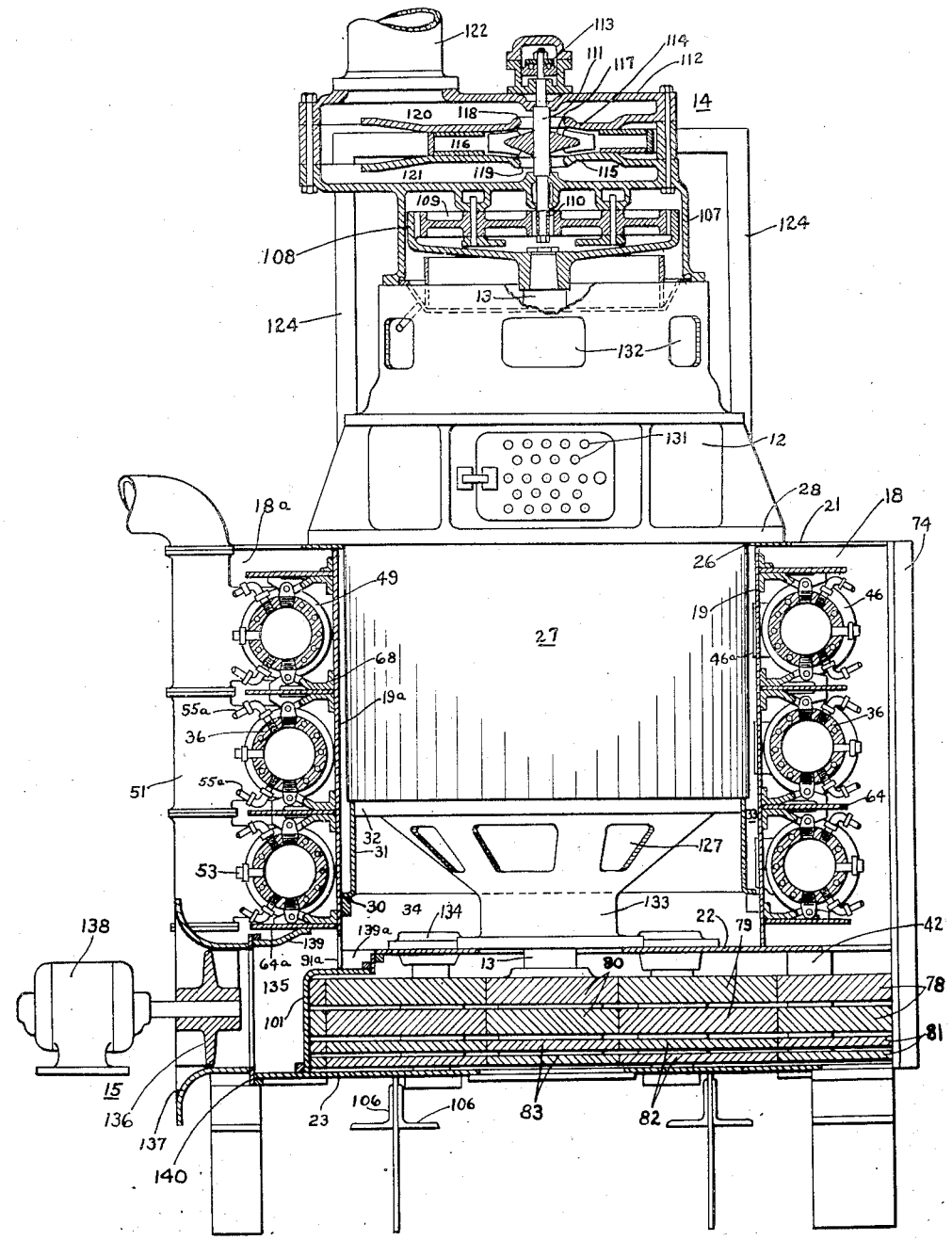
Fig. 3 is a vertical sectional view of the engine structure showing the generator in elevation.

Referring now to the apparatus, at 14, for supplying scavenging air to the chamber 33, in Fig. 3, we show the upper end of the armature shaft 13 passing through the bottom wall of the casing 107 for speed-increasing gearing including an internal gear 108 to which the shaft 13 is connected. The internal gear meshes with idlers 109, the latter, in turn, meshing with a central pinion or gear 110 carried by the lower end of the blower rotor shaft 111. The shaft 111 extends through the blower housing 112 and it is supported by a thrust bearing 113. Partition members 114 and 115 are arranged in the housing 112 and they cooperate with the casing construction 116 to provide a housing or radial diffuser for the runner 117 on the shaft 111. The partition members provide entrance eyes 118 and 119 for the runner chamber, the eyes opening into communicating upper and lower passages 120 and 121 to which air is admitted from the inlet 122. The casing construction 116 constitutes a radial diffuser for the runner and it is provided with convergent portions 123 (Fig. 2) opening into conduits 124 leading to openings 125 in the top horizontal plate 21. The blower is, therefore, operated from the generator armature to supply scavenging air to four corners of the scavenging air space 33.

Referring now to the generator cooling apparatus, air is supplied to the space 34 by apparatus, at 15, air passing up through openings 127 in the lower end portion of the generator frame, then up between the field and armature portions 128 and 129 (Fig. 4) and then out the openings 131 and 132 in the upper portion of the generator frame. The lower portion of the generator frame is provided with a hub or neck portion 133 (Fig. 3), which fits against the top surface of the intermediate plate 22; and, as the openings 102 in the plate are covered by bearing caps 134, the chamber 34 is closed except for the openings 127 and the inlet passage 135, the latter passage being supplied with air by a propeller 136 arranged in the convergent housing 137 and driven by the motor 138.

Figure 12:
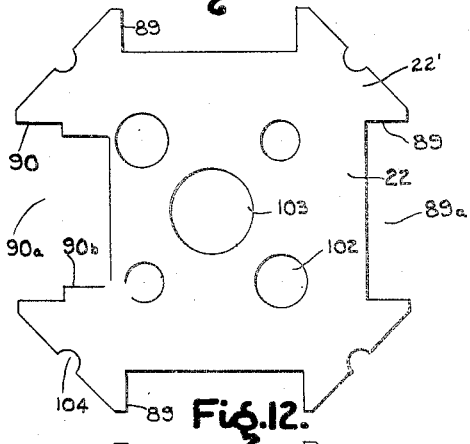
Figures 8, 9:
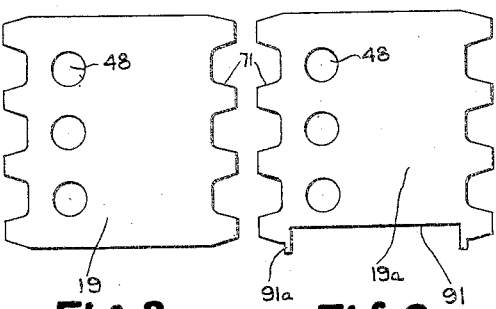
Figure 13:
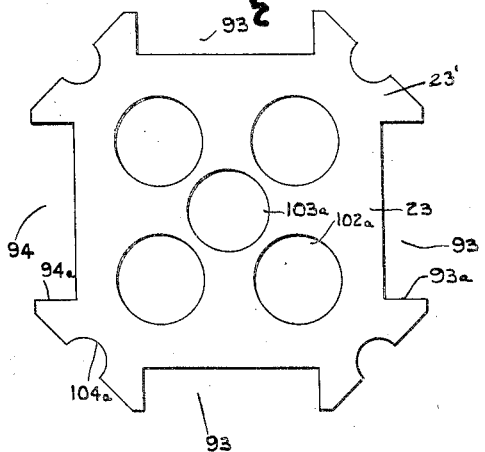

Referring to the passage 135, as may be seen from Fig. 3, it is preferably provided by vertical plates 18ª, by the angular plate 101, connected to the lower surface of the intermediate plate 22 rearwardly of the bottom or back edge of the cut out space 90ª Fig. 12) and connected to the upper surface of the plate 23 rearwardly of the bottom or back edge of the shallow cut out space 94, by a tension plate 64ª, by a plate 139 secured to the lower side of the tension plate and by lateral filler plates 139ª secured to the tongues 91ª, to the plate 22, and to the upper horizontal portion of the angle plate 101. The tension plate 64ª differs from the remaining tension plates in that the ends thereof extend to be flush against sides of the corner plates 18ª. The plate 139 is secured in place with respect to the lower surface of the tension plate 64ª and it extends downwardly and outwardly so that its outer edge is in substantial vertical alignment with the back or bottom edge of the shallow cut out space 94. A cover plate 140 is secured to the plates 139, 23 and 18ª and it is provided with an opening for the propeller housing 137.

As shown, the air starting and fuel distributing system, at 16, is operated by a shaft 142 receiving power from the transmission gearing which connects the crank shafts with the generator rotor shaft 13.

The exciter, at 17, is provided with brackets 143 adapted to be secured to brackets 144 on the generator 12 and the exciter is aligned with one of the crank shafts so that the rotor thereof may be directly connected to the aligned crank shaft.

From the foregoing, it will be apparent that we have provided a power plant installation wherein both the generator and the internal combustion engine type of prime mover are supported by a frame construction, the frame construction being relatively light, readily manufactured and assembled, resistant to forces encountered, and having the material thereof disposed advantageously. In general, the frame is made up of channel-like elements connected together by the crank shaft bearings and by gusset plates.

The chamber or space provided by the vertical side plates, the gusset plates, the upper and lower horizontal plates, and by the generator frame is divided into upper and lower chambers for the reception of scavenging air and generator cooling air. In addition, therefore, to supporting the generator and the engine in the novel and peculiarly coactive way pointed out, the frame provides, in connection with the generator, suitable chambers for both scavenge air and generator cooling air. Also the frame is formed to provide a gear housing below the air chambers, and vertical corner elements extend below the gear housing and constitute supporting legs for the construction.

While we have shown our invention in but one form, it will be obvious to those skilled in the art that it is not so limited, but is susceptible of various changes and modifications without departing from the spirit thereof, and we desire, therefore, that only such limitations shall be placed thereupon as are imposed by the prior art or as are specifically set forth in the appended claims.

What we claim is:—

1. In power plant apparatus, the combination of a frame construction including vertical plates and means supported by the vertical plates and providing a scavenge air supply chamber; and two-cycle internal combustion engine means disposed about and carried by the frame construction and including cylinders and means for supplying scavenging air to the latter from the chamber.

2. In power plant apparatus, the combination of a box construction providing a scavenge air supply chamber, means for supporting the box construction, two-cycle internal combustion engine means including cylinders carried by the supporting means, and means for supplying scavenging air from the chamber to the cylinders.

3. In power plant apparatus, the combination of a box construction providing a scavenge air supply chamber, means for supporting the box construction, two-cycle internal combustion engine means disposed about the box construction and including cylinders carried by said supporting means, and means for supplying scavenging air from the chamber to the cylinders.

4. In power plant apparatus, the combination of a box construction providing a scavenge air supply chamber, vertically disposed supporting plate members for the box construction connected externally to the latter and extending throughout the height thereof, two-cycle internal combustion engine means disposed about the box construction and including cylinders carried by said plate members, and means for supplying scavenging air from the chamber to the cylinders.

5. In a prime mover installation, the combination of a supporting frame including a plurality of channel elements, means for connecting the channel elements in polyhedral formation including crank shaft bearings connected to the web portions of the channel elements, means cooperating with the channel elements to define a scavenge air supply chamber, two-cycle internal combustion engine cylinders having the end portions thereof supported by flange portions of the channel elements and provided with air inlet openings, means for supplying air from said chamber to the inlet openings of the cylinders, crank shafts carried by the bearings, opposed pistons in the cylinders and connected to the crank shafts, and means for connecting the crank shafts for operation in unison.

6. In a prime mover installation, the combination of a supporting frame including a plurality of vertically disposed channel elements with the flange portions thereof extending below the web portions, means cooperating with the web portions to define a scavenge air supply chamber, crank shaft bearings alternately arranged with respect to the channel elements and secured to the latter, horizontally disposed two-cycle internal combustion engine cylinders having the end portions thereof supported by the flange portions of the channel elements and provided with air inlet openings, means for supplying scavenging air from said chamber to the inlet openings of the cylinders, vertically disposed crank shafts carried by the bearings, opposed pistons in the cylinders and connected to the crank shafts, and means carried by the frame and disposed below said chamber for connecting the crank shafts for operation in unison.

7. In a prime mover installation, the combination of a supporting frame including a plurality of channel elements, means for connecting the channel elements in polyhedral formation including crank shaft bearings and gusset members both connected to the web portions of said elements, means cooperating with the web portions of the channel elements and with the gusset members for defining a scavenging air supply chamber, two-cycle internal combustion engine cylinders having the end portions thereof supported by the flange portions of the channel elements and provided with air inlet openings, means for supplying scavenging air from said chamber to the inlet openings of the cylinders, crank shafts carried by the bearings, opposed pistons in the cylinders and connected to the crank shafts, and means for connecting the crank shafts for operation in unison.

8. In engine apparatus, the combination of a vertical polyhedral frame providing a scavenge air supply chamber and having vertical supporting plates; two-cycle internal combustion engine means disposed about and carried by the frame and including cylinders having scavenge air inlet openings in communication with said chamber and vertical crank shafts carried by the corners of said frame; and power delivering means including gearing for interconnecting the crank shafts; lower ends of said vertical supporting plates being formed to provide supporting feet for the apparatus.

9. In a prime mover installation, the combination of a two-cycle engine and driven machine supporting frame including a plurality of channel elements having the web portions thereof connected in polygonal formation by bearing supports and by gusset plates and end plates joined to the web portions of the channel elements to define a scavenge air supply chamber, and tension members disposed transversely of the channel elements, passing through the flange portions thereof, and being connected to the bearing supports; two-cycle internal combustion engine means including cylinders disposed between adjacent tension members, having the terminal portions thereof supported by the flange portions of said channel elements, and provided with scavenge air inlet openings communicating with said chamber, bearings provided on said bearing supports, and crank shafts fitting the bearings; a driven member; and gearing for connecting all of said crank shafts to said driven member.

10. In a prime mover installation, the combination of an engine supporting frame including a plurality of vertically disposed channel elements, means including corner bearings and gusset plates for connecting the web portions of the channel elements in polyhedral formation so that the flange portions of the channel elements extend outwardly, horizontally disposed plate members cooperating with the web portions of said channel elements and with the gusset plates to define an air supply chamber, and tension members extending transversely of the web portions and connected to the latter and to horizontally opposed bearings; two-cycle internal combustion engine means disposed about the frame and including horizontally disposed cylinders of the opposed-piston type having the terminal portions thereof slidably supported by the flange portions of said channel elements and provided with scavenge air inlet openings communicating with said chamber, means for anchoring the cylinders against bodily axial movement, crank shafts carried by said bearings, and opposed pistons in the cylinders and connected to the crank shafts; a driven member; and gearing for connecting each of the crank shafts to the driven member.

11. In a prime mover, the combination of pairs of parallel and vertically disposed cylinder supporting plates, a side plate connected to each pair of supporting plates, upper and lower horizontal plates joined to the side plates and having triangular portions engaging adjacent cylinder supporting plates of the pairs, means cooperating with the side plates and with the upper and lower plates to define a scavenge air supply chamber, a lowermost horizontal plate having triangular portions fitting between and connected to faces of adjacent cylinder supporting plates and cooperating with the lowermost of said chamber-forming plates to provide a space for gearing, two-cycle internal combustion engine means surrounding said side plates and including cylinders of the opposed-piston type supported by said cylinder supporting plates and including vertical crank shafts disposed between adjoining cylinder supporting plates of the pairs and extending into said gear space, a driven member having a part extending into the gear space, and gearing in said space for connecting the crank shafts to the driven member part.

12. In a prime mover, the combination of a frame construction including pairs of parallel vertical corner plates disposed in polygonal formation, upper and intermediate horizontal plates and vertical side plates connected to said vertical corner plates and forming a scavenge air supply chamber, a lower horizontal plate connected to the corner plates, corner bearings disposed between adjoining corner plates, and horizontal tension plates extending transversely of the side plates and connected to the latter and to the corner bearings, two-cycle internal combustion engine cylinders disposed horizontally and having the terminal portions thereof carried by said corner plates and provided with scavenge air inlet ports communicating with said chamber, vertical crank shafts carried by said corner bearings, opposed pistons in the cylinders and connected to the crank shafts, and gearing disposed between the intermediate and lower horizontal plates for interconnecting the crank shafts.

13. In an internal combustion engine of the two-cycle type, the combination of a polyhedral box construction providing a scavenge air supply chamber, outwardly extending and vertical plates disposed adjacent to the vertical corners of said box construction, horizontal cylinders extending between and having the terminal portions thereof supported by pairs of said plates extending outwardly from each vertical side face of said construction, said cylinders having scavenge air inlet openings communicating with said chamber, crank shaft bearings carried by the construction at each vertical corner thereof, vertical crank shafts carried by the bearings, opposed pistons in the cylinders and connected to the crank shafts, driven mechanism including gearing for interconnecting all of said crank shafts, and means disposed below the gearing and cooperating with vertical corner plates below the gearing for supporting the engine.

14. In a prime mover, the combination of a box construction having side and end walls providing a scavenge air supply chamber, cylinder supporting means provided on each side wall, bearings secured to the construction at the corners formed by the side walls, and tension members extending transversely of the side walls and connected to the bearings, two cycle internal combustion engine cylinders carried by the cylinder-supporting means, crank shafts carried by the bearings, and opposed pistons in the cylinders and connected to the crank shafts, the points of connection of the tension members with said bearings being outside of the polygon defined by intersecting cylinder axes.

15. In a prime mover, the combination of a frame including means providing an upper chamber for scavenging air and a lower compartment for gearing and including vertical prime mover supporting plates; and two-cycle internal combustion engine means carried by the frame and including horizontal cylinders disposed about the upper chamber and provided with scavenge air inlet openings communicating with the chamber, vertical crank shafts, and pistons in the cylinders and connected to the crank shafts; gearing in the lower compartment for connecting the crank shafts; and supporting means for the prime mover and cooperating with said vertical supporting plates below the gearing compartment.

16. In a prime mover, the combination, with engine means, of an engine supporting frame including a box construction having side plates, cylinder support plates joined to exterior faces of the side plates, transverse plates joined to the side plates, said cylinder support plates and the transverse plates being provided with crank case seating faces, and crank cases secured in place with respect to said faces.

17. In a prime mover, the combination of an engine supporting frame including a box construction having side plates, end plates joined to the side plates, and gusset plates formed independently of the side plates and having the lateral margins thereof connected to the latter; and engine means disposed about and carried by said frame.

18. In a prime mover, the combination of an engine supporting frame including a box construction having side plates joined by gusset plates and independent cylinder supporting plates connected to the side plates, and engine means disposed about the frame and including cylinders carried by said cylinder supporting plates.

19. In a prime mover, an engine supporting frame including a box construction having side plates, gusset plates having flange portions fitting interior faces of the side plates adjacent to lateral margins of the latter, cylinder supporting plates extending outwardly from said side plates and having flange portions aligned with said gusset plate flange portions with said side plates arranged therebetween, common means for joining the side plates and said flange portions of the gusset and cylinder supporting plates, and engine means disposed about the box construction and including cylinders carried by the cylinder supporting plates.

20. In a prime mover, an engine supporting frame consisting of side plates, gusset plates joining the side plates, and separate cylinder supporting brackets connected to each side plate adjacent to lateral margins of the latter.

21. In an engine, a supporting frame consisting of side plates and cylinder supporting plates connected to each side plate, at least part of said cylinder supporting plates forming supporting feet for the engine.

22. In a prime mover, an engine supporting frame construction including vertical side plates, top and intermediate horizontal plates, cylinder supporting plates connected to the side plates, and an additional horizontal plate connected to the cylinder supporting plates and providing, with said intermediate plate, a space for gearing.

23. In a prime mover, an engine supporting frame including a box construction consisting of side and end plates and cylinder supporting plates connected to the side plates, at least part of the cylinder supporting plates being formed to provide frame supporting feet.

24. In a prime mover, the combination of an engine supporting frame including side plates provided with laterally extending tongues and crank shaft bearings connected to adjacent and registering tongues.

25. In a prime mover, the combination of an engine supporting frame including side plates provided with laterally extending tongues, means for joining the side plates inside of said tongues, and crank shaft bearings connected to adjacent and registering tongues.

26. In a prime mover, the combination of an engine supporting frame including side plates provided with laterally extending tongues, crank shaft bearings connected to adjacent tongues, and tension means for connecting the bearings.

27. In a prime mover, the combination of a polyhedral engine supporting frame including side plates provided with laterally extending tongues, means for joining the side plates inside of said tongues, crank shaft bearings connected to adjacent tongues, said bearings being arranged in coplanar sets, and tension means for joining the bearings of each set.

28. In a prime mover, the combination of an engine supporting frame including side plates provided with laterally extending tongues, bearings connected to adjacent tongues, said bearings being arranged in coplanar sets, and tension members secured to the side plates and connecting the bearings of each set in closed series.

29. In a prime mover, the combination of an engine supporting frame including side plates, cylinder supporting plates secured to the side plates adjacent to lateral margins of the latter, and crank shaft bearings secured to the side plates and to the cylinder supporting plates.

30. In a prime mover, the combination of an engine supporting frame including side plates, cylinder supporting plates secured to the side plates adjacent to lateral margins of the latter, bearings secured to the side plates and to the cylinder supporting plates, and tension members extending transversely of the side plates for connecting the bearings.

31. In a prime mover, the combination of an engine supporting frame including a box construction having side plates, cylinder supporting plates secured to the side plates adjacent to lateral margins of the latter, corner bearings secured to the side plates and to the cylinder supporting plates, and tension plates extending transversely of and secured to the side plates and connected to the corner bearings.

32. In a prime mover, the combination of an engine supporting frame including a box construction having side plates, a pair of parallel cylinder supporting plates secured to each side plate adjacent to lateral margins of the latter and provided with aligned cylinder openings, and corner bearings secured to the side plates and disposed beyond and between adjacent cylinder openings in a cylinder support plate.

33. In a prime mover, an engine supporting frame embodying pairs of opposed vertical cylinder supporting plates arranged in polyhedral formation and horizontal plates connected to the cylinder supporting plates and having angular portions fitting adjacent surfaces of adjoining cylinder supporting plates.

34. In a prime mover installation, an engine supporting frame including a plurality of sets of vertically disposed cylinder supporting members, the sets being arranged in polyhedral formation, and horizontal plates for joining the cylinder supporting plates of each set and having angular portions for connecting adjacent vertical plates of the sets.

35. In a prime mover, an engine frame including vertically disposed cylinder supporting plates connected by side plates to form sets and horizontal plates having angular corner portions secured to adjacent cylinder supporting plates of the sets.

36. In a prime mover, the combination of a polyhedral frame, bearings secured to the frame at parallel corners thereof, tension members disposed transversely of the frame and connected to the bearings, and engine means carried by the frame and including power-operated elements connected to crank shafts carried by said bearings, the axes of said bearings and crank shafts being located between boundaries of polyhedra formed by intersecting planes passing through the connections of the bearings with the frame and with the tension members.

37. In a prime mover installation, the combination of an engine and driven machine supporting frame including a plurality of vertically disposed channel elements disposed in polyhedral formation; engine means surrounding the frame and including horizontally disposed cylinders carried by the channel elements, corner bearings alternating with the channel elements and secured to the latter, vertically disposed crank shafts carried by the corner bearings, and tension members extending horizontally and transversely of the channel elements and joined to the corner bearings; a driven machine having feet supported by the channel elements; and gearing for connecting the crank shafts to the driven machine.

38. In a prime mover, the combination of an engine supporting frame including a box construction provided with an outer end plate and side plates and the outer end plate having an opening, a driven machine fitting the opening and extending partly within the box construction, cylinder supporting plates secured to the side plates, engine means disposed about the box construction and including cylinders carried by the cylinder supporting plates, and means for mechanically connecting the engine means with the driving element of the driven machine.

39. In a power plant installation, the combination of an engine supporting frame including a box construction having side and end plates and cylinder supporting plates secured to the side plates adjacent to lateral margins of the latter, one of said end plates being provided with a central opening; a driven machine fitting the opening and extending within the box construction; engine means surrounding the box construction and including cylinders supported by the cylinder supporting plates, and crank shafts; and gearing for connecting the crank shafts to the driving element of the driven machine.

40. In a power plant installation, the combination of an engine and a driven machine supporting frame including a box construction having side plates, upper and lower end plates connected to the side plates, vertically extending cylinder supporting plates secured to the side plates adjacent to lateral margins of the latter, said upper end plate being provided with a central opening, a driven machine fitting the opening and extending within the box construction, engine means disposed about the box construction and including horizontally disposed cylinders carried by said cylinder supporting plates and crank shafts, and gearing arranged below the lower end plate of the box construction for connecting the crank shafts to the rotor of the generator.

41. In a power plant installation, the combination of an engine and a driven machine supporting frame including a box construction having vertical side plates and upper and lower horizontal end plates, the upper end plate being provided with an opening, engine means disposed about and supported by the box construction, said engine means including horizontally disposed cylinders and vertical crank shafts extending below the lower end plate, the crank shafts being arranged, respectively, at the vertical corners of the box construction, a driven machine fitting the opening in said upper plate and extending within the box construction, a driving shaft extending from the driven machine downwardly and through the lower end plate, and gearing for connecting the lower ends of the crank shafts to the lower end of the driving shaft.

42. In a power plant installation, the combination of an engine and a driven machine supporting frame including a box construction having vertical side plates, vertically disposed cylinder supporting plates secured to the side plates adjacent to lateral margins of the latter, each side plate and its connected cylinder supporting plates forming a built-up supporting channel element; a driven machine supported by the channel elements; engine means disposed about the box construction and including horizontally disposed cylinders connected to the cylinder supporting plates and vertically disposed crank shafts; and means for connecting the crank shafts to the rotor of the driven machine.

43. In a power plant installation, the combination of an engine and a driven machine supporting frame including a box construction having vertical side plates, vertically disposed cylinder supporting plates secured to the side plates adjacent to lateral margins of the latter, each side plate and its connected cylinder supporting plates constituting built-up supports, means for reinforcing said supports, a driven machine supported by said supports, engine means disposed about the box construction and including cylinders having the ends thereof supported by the cylinder support plates and including vertically disposed crank shafts, and gearing for connecting the crank shafts to the driving element of the driven machine.

44. In a power plant installation, the combination of an engine and a driven machine supporting frame including vertically disposed side plates, vertically extending cylinder supporting plates secured to the side plates and arranged normally with respect to the latter, bearings connected to adjacent edges of the side plates and having portions resting against adjacent faces of the cylinder supporting plates, tension members for connecting horizontally adjacent bearings, the tension members passing through said cylinder supporting plates, a driven machine having supporting feet arranged each above the upper edge of a side plate and between its connected cylinder supporting plates, engine means disposed about the frame and including horizontally disposed cylinders whose terminal portions are supported by the cylinder supporting plates and including vertically disposed crank shafts carried by said bearings, and gearing for connecting the crank shafts to the driving element of the driven machine.

45. In a power plant installation, the combination of an engine and a driven machine supporting frame consisting of a plurality of built-up, channel-like constructions disposed in polyhedral formation, a driven machine supported by the channel constructions, engine means surrounding the frame and including cylinders having end portions supported by the flange portions of said channel constructions and including crank shafts disposed in the angular spaces formed by adjoining channel constructions, and means for connecting the crank shafts to the driving element of the driven machine.

46. In a prime mover, the combination of a box structure, a driven machine extending partly within and partly without the box structure, engine means including cylinders carried by sides of said box structure and crank shafts supported at corners of said structure, and means for mechanically connecting the crank shafts with the driving element of the driven machine.

47. In a prime mover, the combination of a box structure, a driven machine extending partly within and partly without the box structure, engine means disposed about the box structure and including cylinders carried by the sides thereof and crank shafts disposed at the corners of such structure, and means for mechanically connecting the crank shafts with the driving element of the driven machine.

48. In a prime mover installation, the combination of a box structure providing a scavenging air supply chamber; a driven machine extending partly within and partly without the box structure; two-cycle internal combustion engine means disposed about the box structure and including cylinders of the opposed-piston type carried by sides of said structure and provided with inlet openings communicating with said chamber, crank shafts supported at corners of the structure, and pistons in the cylinders and connected to the crank shafts; and means for mechanically connecting the crank shafts with the driving element of the driven machine.

49. In power plant apparatus, the combination of a box construction, supporting means for the box construction, a driven machine carried by the box construction and arranged partly within and partly without the latter and cooperating with the interior walls thereof to define a scavenge air supply chamber, and two-cycle internal combustion engine means disposed about the box construction and connected to the driven machine, said engine means including cylinders carried by the supporting means and means for supplying scavenging air from the chamber to the cylinders.

In testimony whereof, we have hereunto subscribed our names this 22nd day of March, 1927.

HERBERT T. HERR.
ALEXANDER T. KASLEY.